United States Patent [19]

Ang et al.

[11] Patent Number: 5,056,362
[45] Date of Patent: Oct. 15, 1991

[54] STRENGTHENING A SILICON MICROMACHINED MASS AIR FLOW SENSOR IN THE REGION OF ITS HOT ELEMENT

[75] Inventors: Leoncio T. Ang, Newport News; Charles R. Cook, Jr., Williamsburg, both of Va.

[73] Assignee: Siemens Automotive L.P., Auburn Hills, Mich.

[21] Appl. No.: 558,118

[22] Filed: Jul. 25, 1990

[51] Int. Cl.$^5$ ................................................ G01F 1/68
[52] U.S. Cl. ................................................ 73/204.26
[58] Field of Search ............ 73/118.2, 204.23, 204.27, 73/204.26

[56] References Cited

U.S. PATENT DOCUMENTS 3,931,736  1/1976  Olmstead .................... 73/204.23
4,624,137  11/1986  Johnson et al. ............. 73/204.26

Primary Examiner—Robert Raevis
Attorney, Agent, or Firm—George L. Boller; Russel C. Wells

[57] ABSTRACT

A matrix consisting of glass microspheres and cured epoxy is disposed in a cavity at the backside of the silicon diaphragm to strengthen the diaphragm without any significant adverse influence on the ability of the sensor to quickly and accurately respond to changes in mass air flow. The strenthening which is imparted to the device enables it to comply with certain specifications defining the extent to which the device must be capable of withstanding damage from air-entrained dust particles acting on the frontside of the diaphragm.

6 Claims, 2 Drawing Sheets

STRENGTHENING A SILICON MICROMACHINED MASS AIR FLOW SENSOR IN THE REGION OF ITS HOT ELEMENT

BACKGROUND AND SUMMARY OF THE INVENTION

This invention relates generally to silicon mass air flow (MAF) sensors and in particular to an improved means for structurally strengthening the diaphragm in the region of the hot element.

While a silicon micromachined MAF sensor can offer certain benefits over one which comprises wound wire elements, the long-term survival of the former in "dusty" air flows has not been demonstrated to the degree that an automotive manufacturer whose products incorporate the latter for measuring the engine's induction air flow is ready to change over. In order to attain a possibility of acceptance by the automotive manufacturer, a silicon micromachined MAF sensor must survive accelerated dust testing under a condition where hundreds of grams of dust are flowed past the sensor within a few hours, and at rather substantial flow rates in terms of grams of dust per hour.

One improvement to the life expectancy of a silicon micromachined MAF sensor is attained by the use of a dust deflector which "shades" the sensor die from direct impacts. Examples of such technology are presented in commonly assigned Ser. No. 07/474,429 filed 02/02/90.

The improvement which is the subject of the present invention does not involve the use of a deflector element; rather, it involves a novel structure for the reliable long-term integrity of the silicon, consonant with the mandate that the sensor possess a fast and accurate response to the induction air flow, particularly to rapidly changing flow rates which can occur in the engine's air induction system.

The basic operating principle of a silicon micromachined air flow sensor is the same as that of a hot wire, or hot film, anemometer which dissipates power to the air flow in proportion to the flow velocity. (A reference sensor which does not dissipate power is used for temperature compensation.) In a silicon air flow sensor, a thin conductor layer (gold, for example) is the hot element. The response of the hot element to the air flow is optimized by minimizing the "heat sink" effect of the sensor structure which supports the hot element, i.e. minimizing heat transfer from the hot element to the support structure. In this way the power input to the hot element will be maximally transferred to the air flow.

One way of minimizing this "heat sink" effect in a silicon MAF sensor is by minimizing the thickness of the diaphragm in the region which supports the hot element. This region, which may be fabricated to only 1 micron thickness for example, is also designed to withstand a certain differential pressure, one atmosphere for example. The requirements imposed on the hot element support region of the silicon for the purpose of sensor responsiveness render the region prone to dust-impact-caused failure when subjected to testing like that described above.

The present invention relates to a support structure for improving the long-term survivability of the diaphragm in a dust-impacting environment without compromising the MAF sensor's accuracy and speed-of-response. Moreover, the invention attains this improvement without adding unacceptable cost or complexity to the fabrication process.

Briefly, the invention comprises a support structure consisting of a matrix of hollow glass microspheres distributed throughout an epoxy binder and disposed to provide backside support of the very thin region of the diaphragm whose frontside contains the hot element.

Further features, advantages, and benefits of the invention will be seen in the ensuing detailed description of a presently preferred embodiment constructed in accordance with the best mode contemplated at this time for carrying out the invention. Drawings accompany the disclosure and are briefly identified as follows.

DESCRIPTION OF THE PREFERRED EMBODIMENT

Figure 1:
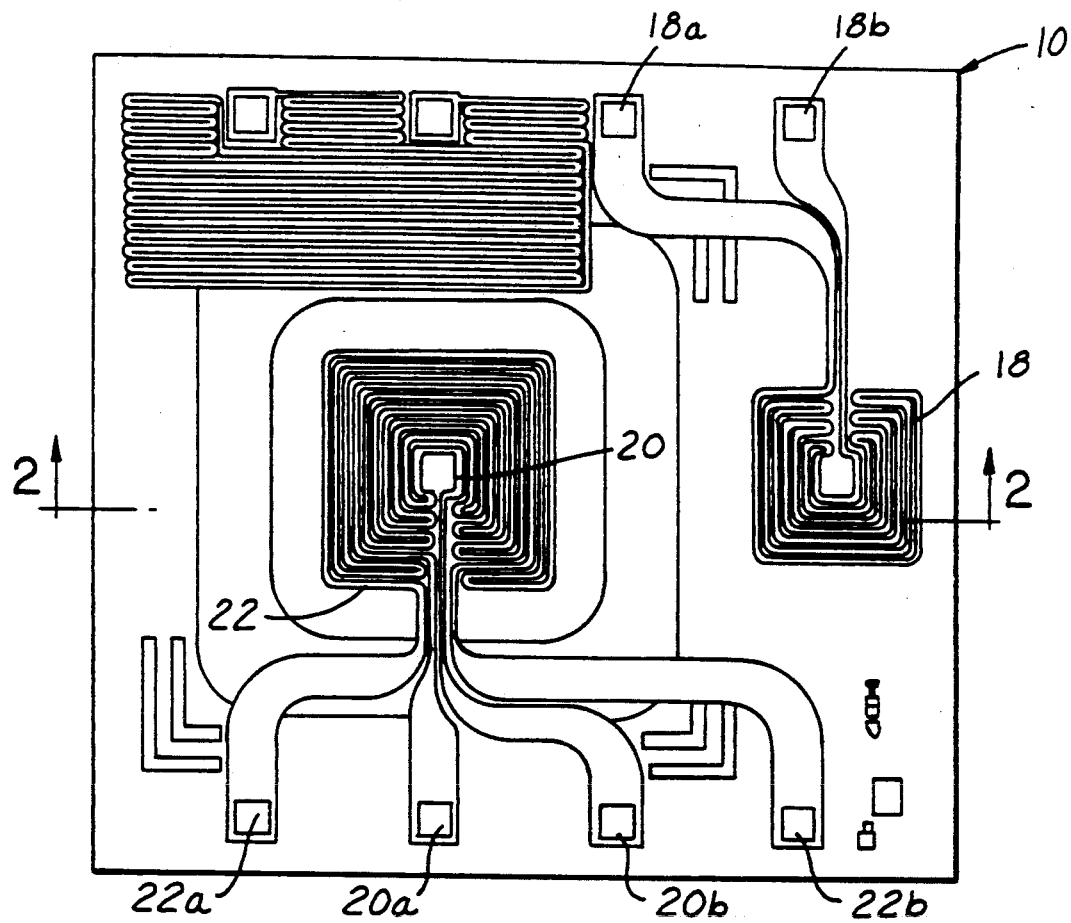
FIG. 1 is an enlarged view looking at the front face of an exemplary MAF sensor.
Figure 2:
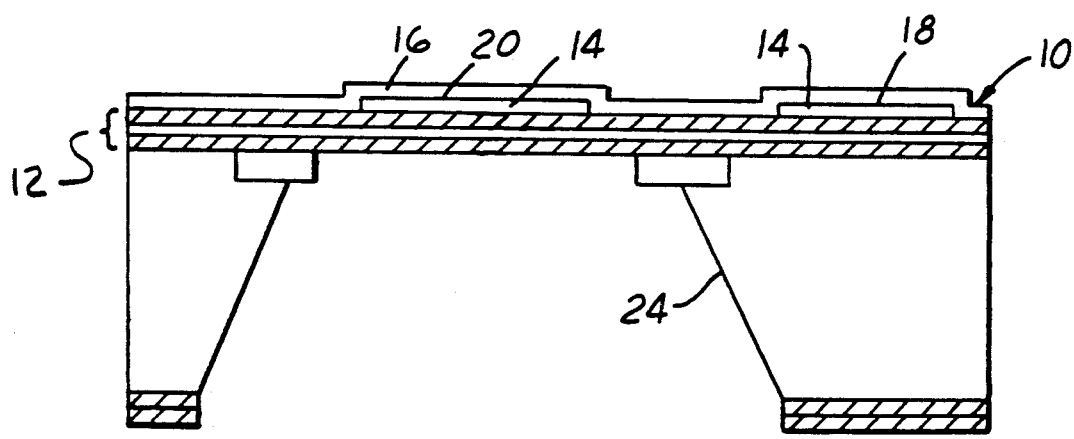
FIG. 2 is a cross sectional view taken in the direction of arrows 2—2 in FIG. 1.

An exemplary silicon micromachined sensor element 10 presented in FIGS. 1 and 2 comprises an ultra-thin oxide-nitride-oxide, diaphragm 12 (example: $SiO_2$—$Si_3N_4SiO_2$) whose frontside contains gold metallization 14 with a passivation overlayer 16.

Gold metallization 14 comprises an ambient (cold) resistance 18 having terminations 18a, 18b, a heated (hot) resistance 20 having terminations 20a, 20b, and a heater 22 having terminations 22a, 22b. When the sensor element is operatively associated with an airflow meter in an automotive vehicle internal combustion engine air induction system, the two resistances and the heater are connected in a conventional electric circuit configuration known to the art.

In order to optimize the response of the element to air flow, a cavity 24 is micromachined in the backside of the silicon directly behind resistance 20 and heater 22 which are on the frontside of the silicon and separated from the cavity by diaphragm 12. Cavity 24 is constructed to leave resistance 20 and heater 22 supported by only the ultra-thin diaphragm 12, one micron thickness for example. Exemplary thicknesses of gold metallization 14 and overlayer 16 are 0.6 micron and 0.5 micron respectively. It is diaphragm 12 that is subject to dust-impact-testing failure.

Figure 3:
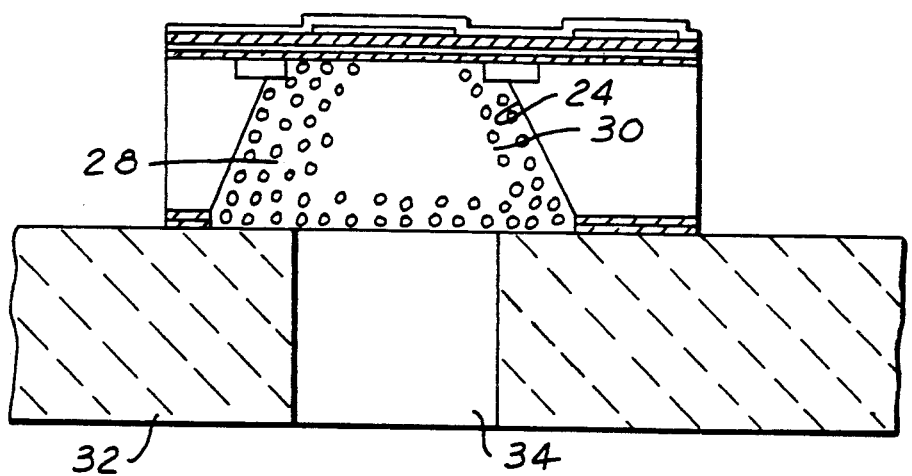
FIG. 3 is a view in the same direction as FIG. 2 including a first embodiment of the support structure of the invention.
Figure 4:
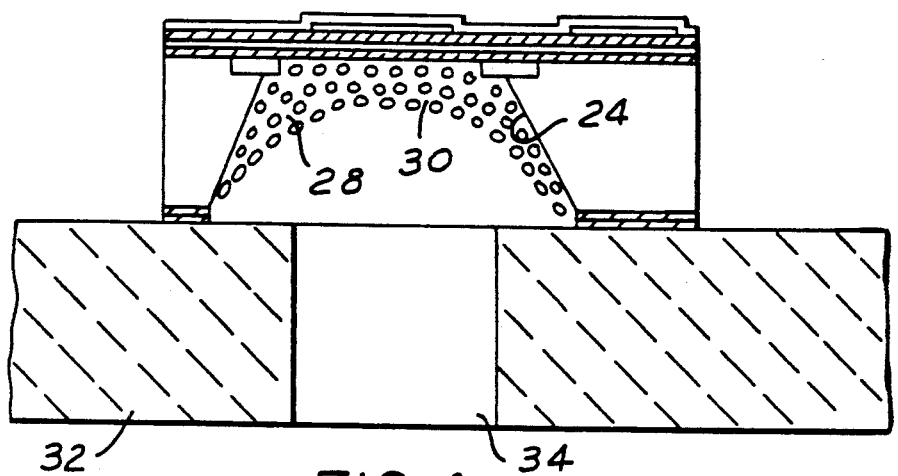
FIG. 4 is a view in the same direction as FIG. 2 including a second embodiment of the support structure of the invention.
Figure 5:
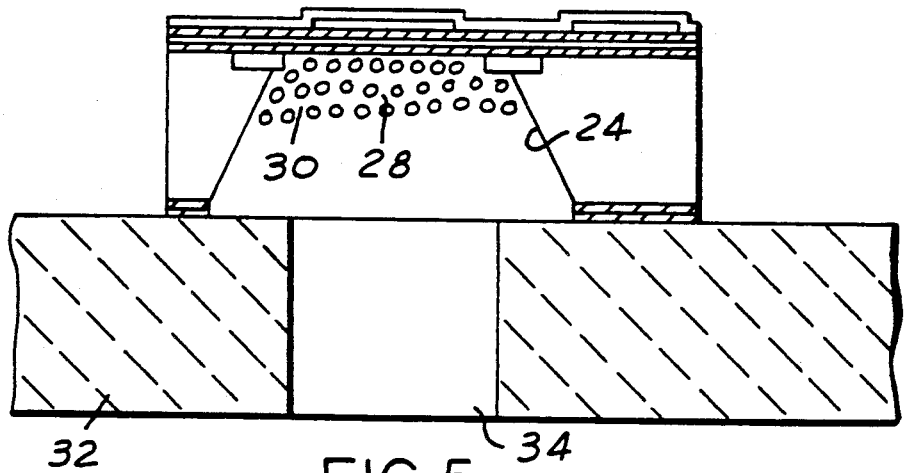
FIG. 5 is a view in the same direction as FIG. 2 including a third embodiment of the support structure of the invention.

In accordance with principles of the invention, the backside of the diaphragm is structurally supported by a support 28 created in cavity 24; see FIGS. 3, 4, 5. Support 28 is made by introducing into the well a mixture of an uncured epoxy resin and a multitude of hollow glass microspheres, and then allowing the resin to cure. After it has cured, the epoxy is a rigid matrix 30 bonding to the sidewall of cavity 24 and containing the hollow glass microspheres throughout.

FIG. 3 illustrates a matrix 30 completely filling cavity 24; FIGS. 4 and 5, examples of partial fillings. In all three illustrations, the backside of diaphragm 12 is totally covered by the matrix, and the matrix is bonded to the cavity's sidewall. In the fabricated element, the silicon is supported on a ceramic substrate 32 in a conventional manner. There is a hole 34 through the substrate to cavity 24.

The extent to which the cavity is filled with the mixture depends on the engineering specifications with which the sensing element must comply. The relative proportions of epoxy and microspheres are preferably such that the maximum density of microspheres is obtained, consistent with adequacy of the epoxy to form the cured matrix and bond to the silicon.

An example of a suitable mixture is:
1) epoxy—AI Technology Incorporated's "Prime bond"-ME 7615.
2) microspheres—3M's "Scotchlite" glass bubbles—type C15/250.
3) relative % by volume of each in the mixture 80%–90% glass; 20–10% epoxy.

The processing can be conducted by evenly mixing the glass bubbles and epoxy; applying the mixture to the cavity with a fine brush (the cavity being inverted from the position shown in the Figs.) curing at 125° C. for 20 minutes; and assembling the sensor into a ceramic carrier.

If necessary, the curing can be accelerated by the addition of heat.

Testing of elements fabricated in accordance with principles of the invention has demonstrated very significant improvements in the ability of the elements to withstand dust-impact.

While a presently preferred embodiment of the invention has been disclosed, principles of the invention can be applied to other embodiments.

What is claimed is:

1. In a silicon micromachined sensor element for mass air flow sensing wherein a hot element is disposed on the frontside of a silicon diaphragm, the improvement which comprises means forming a cavity at the backside of the diaphragm directly behind the hot element, and a matrix disposed within said cavity to strengthen said diaphragm, said matrix comprising cured epoxy resin containing glass microspheres distributed throughout and bonding with the backside of the diaphragm directly behind the hot element and with a sidewall of the cavity.

2. The improvement set forth in claim 1 wherein said matrix consists or from about 80% to about 90% glass microspheres and the remainder epoxy.

3. The improvement set forth in claim 1 wherein the sidewall of the cavity has a frusto-conically tapered shape and the matrix is bonded around the full circumferential extent of the cavity's sidewall.

4. The improvement set forth in claim 3 wherein the matrix completely fills the cavity.

5. The improvement set forth in claim 1 wherein the matrix is bonded to the entirety of the backside of the diaphragm.

6. The improvement set forth in claim 5 wherein the matrix is bonded to the entirety of the cavity's sidewall.

* * * * *